(12) United States Patent
Grubbström et al.

(10) Patent No.: US 9,486,736 B2
(45) Date of Patent: Nov. 8, 2016

(54) METHOD AND A DEVICE FOR CLEANING A CARBON DIOXIDE RICH FLUE GAS

(75) Inventors: Jörgen P. Grubbström, Vaxjo (SE); Wuyin Wang, Vaxjo (SE)

(73) Assignee: General Electric Technology GmbH, Baden (CH)

( * ) Notice: Subject to any disclaimer, the term of this patent is extended or adjusted under 35 U.S.C. 154(b) by 848 days.

(21) Appl. No.: 13/513,860

(22) PCT Filed: Oct. 26, 2010

(86) PCT No.: PCT/IB2010/002727
§ 371 (c)(1),
(2), (4) Date: Jan. 14, 2013

(87) PCT Pub. No.: WO2011/067638
PCT Pub. Date: Jun. 9, 2011

(65) Prior Publication Data
US 2013/0139738 A1    Jun. 6, 2013

(30) Foreign Application Priority Data

Dec. 4, 2009    (EP) ..................................... 09178055

(51) Int. Cl.
| | | |
|---|---|---|
| *B01D 53/50* | (2006.01) | |
| *F23J 15/04* | (2006.01) | |
| *F23J 15/06* | (2006.01) | |
| *F23C 9/00* | (2006.01) | |
| *B01D 5/00* | (2006.01) | |
| *B01D 53/26* | (2006.01) | |

(52) U.S. Cl.
CPC ............. *B01D 53/507* (2013.01); *B01D 5/003* (2013.01); *B01D 5/0012* (2013.01);
(Continued)

(58) Field of Classification Search
CPC .. B01D 5/0012; B01D 5/003; B01D 53/265; B01D 53/50; B01D 53/507; B01D 2256/22; B01D 2257/302; B01D 2257/80; F23C 9/00; F23J 15/04; F23J 15/06; F23J 2215/20; F23J 2219/40; F23J 2219/70; Y02E 20/363
See application file for complete search history.

(56) References Cited

U.S. PATENT DOCUMENTS

| | | |
|---|---|---|
| 4,336,035 A | 6/1982 | Evenstad et al. |
| 4,502,872 A | 3/1985 | Ivester et al. |

(Continued)

FOREIGN PATENT DOCUMENTS

| | | |
|---|---|---|
| CA | 2 758 422 | 10/2009 |
| EP | 0162536 A1 | 11/1985 |

(Continued)

OTHER PUBLICATIONS

Japanese Office Action issued in connection with corresponding JP Application No. 2012541589 on Aug. 20, 2013.

*Primary Examiner* — Amber R Orlando
*Assistant Examiner* — Britanny Precht
(74) *Attorney, Agent, or Firm* — GE Global Patent Operation; Cynthia W. Flanigan

(57) ABSTRACT

A gas cleaning system (8) for cleaning a carbon dioxide rich flue gas containing sulphur dioxide generated in a boiler (2) comprises a first gas cleaning device (10) being operative for removing at least 80% of the sulphur dioxide content of the flue gas generated in the boiler (2), thereby generating a partly cleaned carbon dioxide rich flue gas, and a second gas cleaning device (12), being separate from the first gas cleaning device (10) and being operative for receiving at least a portion of the partly cleaned carbon dioxide rich flue gas that passed through the first gas cleaning device (10). The second gas cleaning device (12) is operative for removing at least a portion of the water content of the partly cleaned carbon dioxide rich flue gas by means of cooling the partly cleaned carbon dioxide rich flue gas to condense water there from.

10 Claims, 4 Drawing Sheets

(52) U.S. Cl.
CPC ........... *B01D 53/265* (2013.01); *B01D 53/50* (2013.01); *F23C 9/00* (2013.01); *F23J 15/04* (2013.01); *F23J 15/06* (2013.01); *B01D 2256/22* (2013.01); *B01D 2257/302* (2013.01); *B01D 2257/80* (2013.01); *F23J 2215/20* (2013.01); *F23J 2219/40* (2013.01); *F23J 2219/70* (2013.01); *Y02E 20/363* (2013.01); *Y02P 70/34* (2015.11)

(56) References Cited

U.S. PATENT DOCUMENTS

| | | |
|---|---|---|
| 4,755,366 A | 7/1988 | Schwartzbach |
| 5,339,755 A * | 8/1994 | Smith .......................... 110/345 |
| 6,574,962 B1 | 6/2003 | Hsu |
| 6,945,052 B2 | 9/2005 | Frutschi et al. |
| 2007/0243119 A1* | 10/2007 | Downs et al. ................. 423/210 |
| 2008/0072762 A1* | 3/2008 | Gal ................. 96/242 |
| 2008/0141672 A1 | 6/2008 | Shah et al. |
| 2008/0178733 A1 | 7/2008 | Gal |
| 2009/0013871 A1 | 1/2009 | Darde et al. |
| 2009/0277363 A1 | 11/2009 | Shibata et al. |

FOREIGN PATENT DOCUMENTS

| | | |
|---|---|---|
| GB | 2 454 266 | 5/2009 |
| JP | 51126971 A | 11/1976 |
| JP | 2009270753 A | 11/2009 |
| WO | 2004026443 A1 | 4/2004 |
| WO | 2005007274 A1 | 1/2005 |

* cited by examiner

METHOD AND A DEVICE FOR CLEANING A CARBON DIOXIDE RICH FLUE GAS

FIELD OF THE INVENTION

The present invention relates to a method of cleaning a carbon dioxide rich flue gas containing sulphur dioxide generated in a boiler combusting a fuel in the presence of a gas containing oxygen gas.

The present invention also relates to a gas cleaning system for cleaning a carbon dioxide rich flue gas containing sulphur dioxide, and a boiler system.

BACKGROUND OF THE INVENTION

In the combustion of a fuel, such as coal, oil, peat, waste, etc., in a combustion plant, such as a power plant, a hot process gas is generated, such process gas containing, among other components, sulfur oxides, such as sulfur dioxide, $SO_2$, and carbon dioxide $CO_2$. With increasing environmental demands various processes for removing carbon dioxide from the process gas have been developed. One such process is the so called oxy-fuel process. In an oxy-fuel process a fuel, such as those fuels mentioned above, is combusted in the presence of a nitrogen-lean gas. Oxygen gas, which is provided by an oxygen source, is supplied to a boiler in which the oxygen gas oxidizes the fuel. In the oxy-fuel combustion process a carbon dioxide rich flue gas is produced, the carbon dioxide content of which can be compressed in a separate unit and be disposed of in order to reduce the emission of carbon dioxide into the atmosphere.

An example of an oxy-fuel boiler is described in US 2007/0243119. The oxy-fuel boiler of US 2007/0243119 generates a process gas which is referred to as a flue gas. The flue gas is directed to a particulate collector for removing dust particles from the flue gas. Then the flue gas is forwarded to a spray tower unit in which sulfur dioxide is removed by means of being brought into contact with a lime stone slurry. The spray tower unit also provides a cooling of the flue gas to condense a portion of the water content of the flue gas.

SUMMARY OF THE INVENTION

An object of the present invention is to provide a method of cleaning a carbon dioxide rich flue gas containing sulphur dioxide generated in a boiler combusting a fuel in the presence of a gas containing oxygen gas, the method being more efficient with respect to removal efficiency and/or operating costs compared to the prior art method.

This object is achieved by a method of cleaning a carbon dioxide rich flue gas containing sulphur dioxide generated in a boiler combusting a fuel in the presence of a gas containing oxygen gas, the method comprising removing at least 80% of the sulphur dioxide content of the flue gas generated in the boiler in a first gas cleaning device to generate a partly cleaned carbon dioxide rich flue gas, forwarding at least a portion of the partly cleaned carbon dioxide rich flue gas to a second gas cleaning device being separate from the first gas cleaning device, cooling, in said second gas cleaning device, the partly cleaned carbon dioxide rich flue gas to condense water there from, thereby generating a cleaned carbon dioxide rich flue gas having a lower concentration of water vapour than the partly cleaned carbon dioxide rich flue gas.

An advantage of this method is that the removal of the major portion of the sulphur dioxide content of the carbon dioxide rich flue gas can be performed in the first gas cleaning device in a manner which is optimized with respect to sulphur dioxide removal efficiency, without having to account for the cooling of the gas. Many gas cleaning devices that are efficient for removing sulphur dioxide include slurries and/or moistened dust materials comprising calcium based absorbents, such absorbents being prone to cause scaling, in particular at the lower temperatures which may become of interest in a cooling to cause condensation. Furthermore, a condensation in the first gas cleaning device may also cause problems with controlling the water balance of the first gas cleaning device. Hence, performing the major removal of sulphur dioxide in a first gas cleaning device, being optimized for that task, and performing the cooling in the second gas cleaning device, being separate from the first gas cleaning device, provides for efficient and durable operation.

According to one embodiment said step of cooling, in said second gas cleaning device, the partly cleaned carbon dioxide rich flue gas to condense water there from, comprises bringing the partly cleaned carbon dioxide rich flue gas into direct contact with a cooling liquid. An advantage of this embodiment is that the cooling liquid will efficiently cool the partly cleaned carbon dioxide rich flue gas, and will also remove much of the remaining content of sulphur dioxide from the partly cleaned carbon dioxide rich flue gas. Hence, the second gas cleaning device will act as a gas polishing device, in addition to its function as a cooler, yielding a very clean carbon dioxide rich flue gas as end-product.

According to one embodiment the pH-value of the cooling liquid is controlled to be in the range of pH 4-6.5 by means of supplying an alkaline substance having a solubility in water at 20° C. of at least 50 g/liter to said cooling liquid. An advantage of this embodiment is that a pH of 4-6.5, and more preferably a pH of 4.5-6, makes the removal of sulphur dioxide efficient, hence achieving a good gas polishing effect in the second gas cleaning device. The alkaline substance having a solubility in water at 20° C. of at least 50 g/liter has the advantage of not adding any solids to the cooling liquid. Hence, the second gas cleaning device will be operating with a substantially clear liquid. In addition to less problems with scaling in the second gas cleaning device, a process utilizing an alkaline substance with a high solubility also has the advantage of yielding an efficient removal of sulphur dioxide, since the absorbent is readily available for such absorption. Preferably, the alkaline substance is chosen from the group of alkaline substances comprising sodium hydroxide, potassium hydroxide, and sodium carbonate. In addition to being soluble in themselves, those substances also have the additional advantage of yielding with the absorbed sulphur dioxide compounds, such as sodium sulphate, $Na_2SO_4$, that also have a high solubility in water, thereby further reducing the problems with scaling in the second gas cleaning device.

According to one embodiment said cooling liquid comprises less than 10 gram/liter of solids. An advantage of this embodiment is that the second gas cleaning device operating at a very low solids concentration in the cooling liquid will have low problems with scaling, and low problems of wear. Hence, the investment and operating costs of the second gas cleaning device are reduced.

According to one embodiment 50-90% by volume of the partly cleaned carbon dioxide rich flue gas leaving the first gas cleaning device is recirculated to the boiler without such portion being first passed through the second gas cleaning device. An advantage of this embodiment is that the portion of the partly cleaned carbon dioxide rich flue gas that is to be recirculated is returned to the boiler without being treated in the second gas cleaning device. This saves both investment cost, since the second gas cleaning device can be made smaller when it does not need to treat the entire flow of the partly cleaned carbon dioxide rich flue gas, and operating cost, since cooling and polishing of the partly cleaned carbon dioxide rich flue gas is only made of that portion of the gas that is really about to be forwarded to the unit that compresses, or treats in another manner, the carbon dioxide rich flue gas for final disposal. Furthermore, in the event the boiler is an oxy-fuel boiler, one purpose of recirculating a portion of the flue gas is diluting the combustion gases in the boiler. Hence, removing a portion of the water vapour content from the portion of the flue gas that is to be recirculated is not advantageous, since that would decrease the diluting effect, resulting in a need for increasing the recirculation rate further.

According to one embodiment said step of cooling, in the second gas cleaning device, the partly cleaned carbon dioxide rich flue gas to condense water there from comprises cooling the partly cleaned carbon dioxide rich flue gas to such a temperature that the cleaned carbon dioxide rich flue gas comprises 0.5 to 8% by volume of water vapour. An advantage of this embodiment is that a very low amount of water vapour is forwarded with the cleaned carbon dioxide rich gas to the next treatment step, such next treatment step including, for example, a compression of the cleaned carbon dioxide rich flue gas for the purpose of finally disposing of the carbon dioxide.

According to one embodiment at least a portion of the condensed water formed in the second gas cleaning device is forwarded to the first gas cleaning device as make-up water. An advantage of this embodiment is that the condensed water may be utilized in other parts of the process, and in a controlled manner such that the operation of the first gas cleaning device is not disturbed by too high an amount of condensed water being supplied thereto. A remaining portion, if any, of the condensed water may be of such a high purity that it may be utilized for irrigation of farm land and/or disposed of without first having to treat it in extensive water cleaning processes.

According to one embodiment said step of removing at least 80% of the sulphur dioxide content of the flue gas generated in the boiler in a first gas cleaning device, comprises bringing the flue gas generated in the boiler into direct contact with a calcium based absorbent. An advantage of this embodiment is that calcium based absorbents are often comparably cheap and produce attractive end products when utilized for removing sulphur dioxide.

A further object of the present invention is to provide a gas cleaning system for cleaning a carbon dioxide rich flue gas containing sulphur dioxide generated in a boiler combusting a fuel in the presence of a gas containing oxygen gas, the gas cleaning system being more efficient with respect to removal efficiency and/or operating costs compared to the prior art system.

This object is achieved by means of a gas cleaning system for cleaning a carbon dioxide rich flue gas containing sulphur dioxide generated in a boiler combusting a fuel in the presence of a gas containing oxygen gas, the gas cleaning system comprising a first gas cleaning device being operative for receiving the carbon dioxide rich flue gas generated in the boiler and for removing at least a portion of the sulphur dioxide content of the flue gas generated in the boiler, thereby generating a partly cleaned carbon dioxide rich flue gas, and a second gas cleaning device, being separate from the first gas cleaning device and being operative for receiving at least a portion of the partly cleaned carbon dioxide rich flue gas that has passed through the first gas cleaning device, the second gas cleaning device being operative for removing at least a portion of the water content of the partly cleaned carbon dioxide rich flue gas by means of cooling the partly cleaned carbon dioxide rich flue gas to condense water there from, thereby generating a cleaned carbon dioxide rich flue gas having a lower concentration of water vapour than the partly cleaned carbon dioxide rich flue gas.

An advantage of this gas cleaning system is that it provides for a cleaning of the gas which is efficient both with regards to operating, maintenance and investment costs.

According to one embodiment said second gas cleaning device is provided with a pH-control device being operative for controlling the pH value of the cooling liquid by supplying an alkaline substance having a solubility in water at 20° C. of at least 50 g/liter to said cooling liquid. An advantage of this embodiment is that removal of sulphur dioxide from the partly cleaned carbon dioxide rich flue gas becomes more efficient. A further advantage is that the second gas cleaning device can be made from less expensive steel materials, since the pH will not drop to very low levels.

According to one embodiment the second gas cleaning device comprises a condenser which is provided with a packing material for bringing the cooling liquid into contact with the partly cleaned carbon dioxide rich flue gas. An advantage of this embodiment is that efficient contact between the cooling liquid and the partly cleaned carbon dioxide rich flue gas can be achieved in a manner which does not generate a large amount of very small liquid droplets that might harm downstream equipment.

A further object of the present invention is to provide a boiler system which is more efficient than the prior art boiler systems.

This object is achieved by means of a boiler system for generating power by means of supplying a fuel, oxygen gas and recirculated carbon dioxide-rich flue gas to a boiler, the boiler being operative for combusting the fuel under generation of a carbon dioxide rich flue gas containing sulphur dioxide, the boiler system comprising a first gas cleaning device being operative for receiving the carbon dioxide rich flue gas generated in the boiler and for removing at least a portion of the sulphur dioxide content of the flue gas generated in the boiler, thereby generating a partly cleaned carbon dioxide rich flue gas, and a second gas cleaning device, being separate from the first gas cleaning device and being operative for receiving at least a portion of the partly cleaned carbon dioxide rich flue gas that has passed through the first gas cleaning device, the second gas cleaning device being operative for removing at least a portion of the water content of the partly cleaned carbon dioxide rich flue gas by means of cooling the partly cleaned carbon dioxide rich flue gas to condense water there from, thereby generating a cleaned carbon dioxide rich flue gas having a lower concentration of water vapour than the partly cleaned carbon dioxide rich flue gas.

Further objects and features of the present invention will be apparent from the description and the claims.

BRIEF DESCRIPTION OF THE DRAWINGS

The invention will now be described in more detail with reference to the appended drawings in which.

DESCRIPTION OF PREFERRED EMBODIMENTS

Figure 1:
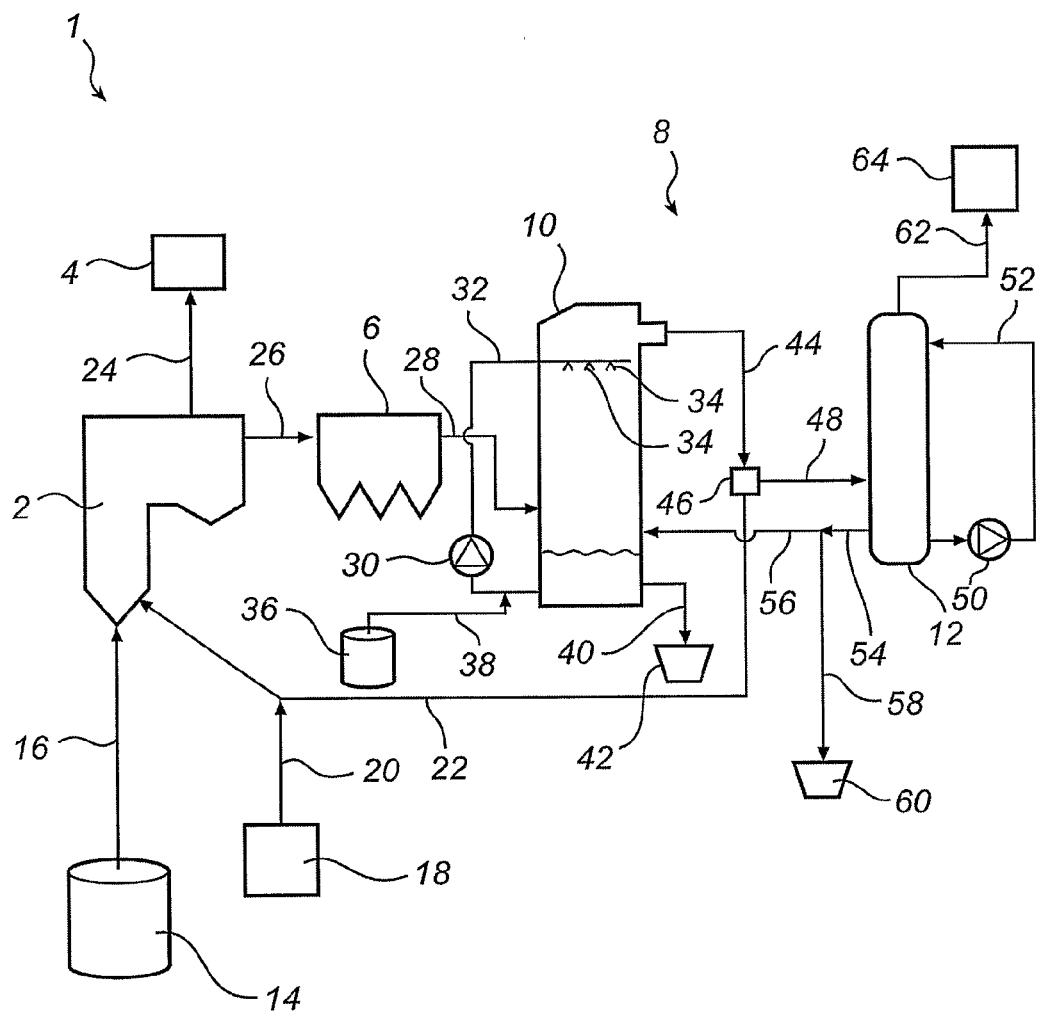
FIG. 1 is a schematic side view of a boiler system in accordance with one embodiment.

FIG. 1 is a schematic representation of a boiler system 1, as seen from the side thereof. The boiler system 1 comprises, as main components, a boiler 2, being in this embodiment an oxy-fuel boiler, a steam turbine, schematically indicated as 4, a particulate removal device in the form of an electrostatic precipitator 6, and a gas cleaning system 8. The gas cleaning system 8 comprises, as its main components, a first gas cleaning device in the form of a wet scrubber 10, and a second gas cleaning device in the form of a condenser 12.

A fuel, such as coal or oil, is contained in a fuel storage 14, and can be supplied to the boiler 2 via a supply pipe 16. An oxygen gas source 18 is operative for providing oxygen gas in a manner which is known per se. The oxygen gas source 18 may be an air separation plant operative for separating oxygen gas from air, an oxygen separating membrane, a storage tank, or any other source for providing oxygen to the system 1. A supply duct 20 is operative for forwarding the produced oxygen gas, comprising typically 90-99.9 vol. % oxygen, $O_2$, to the boiler 2. A duct 22 is operative for forwarding recirculated flue gas, which contains carbon dioxide, to the boiler 2. As indicated in FIG. 1 the supply duct 20 joins the duct 22 upstream of the boiler 2, such that oxygen gas and recirculated flue gas, which contains carbon dioxide, may become mixed with each other to form a gas mixture containing typically about 20-50% by volume of oxygen gas, the balance being mainly carbon dioxide and water vapour, upstream of the boiler 2. Since almost no air enters the boiler 2 there is almost no nitrogen gas supplied to the boiler 2. In practical operation, less than 3 vol. % of the gas volume supplied to the boiler 2 is air, which mainly enters the boiler 2 as a leakage of air. The boiler 2 is operative for combusting the fuel, that is to be supplied via the supply pipe 16, in the presence of the oxygen gas, mixed with the recirculated flue gas, which contains carbon dioxide, that is to be supplied via the duct 22. A steam pipe 24 is operative for forwarding steam, that will be produced in the boiler 2 as a result of the combustion, to the steam turbine 4, which is operative for generating power in the form of electric power. A duct 26 is operative for forwarding carbon dioxide rich flue gas generated in the boiler 2 to the electrostatic precipitator 6. By "carbon dioxide rich flue gas" is meant that the flue gas leaving the boiler 2 via the duct 26 will contain at least 40% by volume of carbon dioxide, $CO_2$. Often more than 50% by volume of the flue gas leaving the boiler 2 will be carbon dioxide. The balance of the "carbon dioxide rich flue gas" will be about 20-50% by volume of water vapour ($H_2O$), 2-7% by volume of oxygen ($O_2$), since a slight oxygen excess is often preferred in the boiler 2, and totally about 0-10% by volume of other gases, including mainly nitrogen ($N_2$) and argon (Ar), since some leakage of air can seldom be completely avoided.

The electrostatic precipitator 6, which may be of a type which is per se known from, for example, U.S. Pat. No. 4,502,872, removes most of the dust particles from the carbon dioxide rich flue gas. As alternative to an electrostatic precipitator a fabric filter, which is per se known from, for example, U.S. Pat. No. 4,336,035, may be utilized for removing the dust particles. A duct 28 is operative for forwarding the carbon dioxide rich flue gas from the electrostatic precipitator 6 to the wet scrubber 10 of the gas cleaning system 8.

The wet scrubber 10 is of the tower scrubber type, a scrubber type which is per se known from, for example, EP 0 162 536. The wet scrubber 10, which is operative for removing at least a portion, and preferably at least 80%, of the sulphur dioxide content of the carbon dioxide-rich flue gas coming from the boiler 2 via the electrostatic precipitator 6, comprises a circulation pump 30 which is operative for circulating, in a slurry circulation pipe 32, a lime stone slurry from the bottom of the wet scrubber 10 to a set of slurry nozzles 34 arranged in the upper portion of the wet scrubber 10. The slurry nozzles 34 are operative for finely distributing the lime stone slurry in the wet scrubber 10 and to achieve good contact between the lime stone slurry and the flue gas being forwarded to the wet scrubber 10 via the duct 28 and flowing substantially vertically upwards inside the wet scrubber 10. Fresh lime stone, $CaCO_3$, is supplied to the circulation pipe 32 from an absorbent supply device comprising a lime stone storage 36 and a supply pipe 38. In the wet scrubber 10, sulphur dioxide, $SO_2$, reacts with the lime stone, $CaCO_3$, to form calcium sulphite, $CaSO_3$, which is subsequently oxidized to form gypsum, $CaSO_4$. The oxidation of calcium sulphite is preferably performed by bubbling air or oxygen gas through the lime stone slurry in an external vessel, not shown in FIG. 1, to avoid mixing the oxidation air or oxygen gas with the carbon dioxide rich flue gas. The gypsum formed is removed from the wet scrubber 10 via a disposal pipe 40 and is forwarded to a gypsum dewatering unit, schematically indicated as 42. The dewatered gypsum may be commercially used, for example in wall board production.

A partly cleaned carbon dioxide rich flue gas leaves the wet scrubber 10 via a duct 44 which forwards the flue gas to a gas distribution point 46. At the gas distribution point 46, being located between the wet scrubber 10 and the condenser 12, as seen with respect to the direction of the flow of the partly cleaned carbon dioxide rich flue gas, the partly cleaned carbon dioxide rich flue gas is divided into two portions, namely a first flow, which via the duct 22 is recirculated back to the boiler 2, and a second flow, which via a duct 48 is forwarded to the condenser 12. The condenser 12 is provided with a circulation pump 50 which is operative for circulating a cooling liquid, via a circulation pipe 52, in the condenser 12 in a manner which will be described in more detail hereinafter.

The cooling liquid being circulated in the condenser 12 cools the partly cleaned carbon dioxide rich flue gas to a temperature which is below its saturation temperature, with respect to water vapour, and, hence, causes a condensation of at least a portion of the water vapour content of the partly cleaned carbon dioxide rich flue gas being forwarded from the wet scrubber 10. The condensed water leaves the condenser 12 via a disposal pipe 54. A portion of the condensed water leaving the condenser 12 via the pipe 54 is forwarded to the wet scrubber 10 via a pipe 56 as make up water. A further portion of the condensed water is forwarded, via a pipe 58, to a water treatment unit 60, in which the condensed water is treated prior to being re-used in the process, for example as boiler water, or being disposed of. The cleaned carbon dioxide rich flue gas leaves the condenser 12 via a duct 62 and is forwarded to a gas processing unit 64 in which the cleaned carbon dioxide rich flue gas is compressed for disposal.

Figure 2:
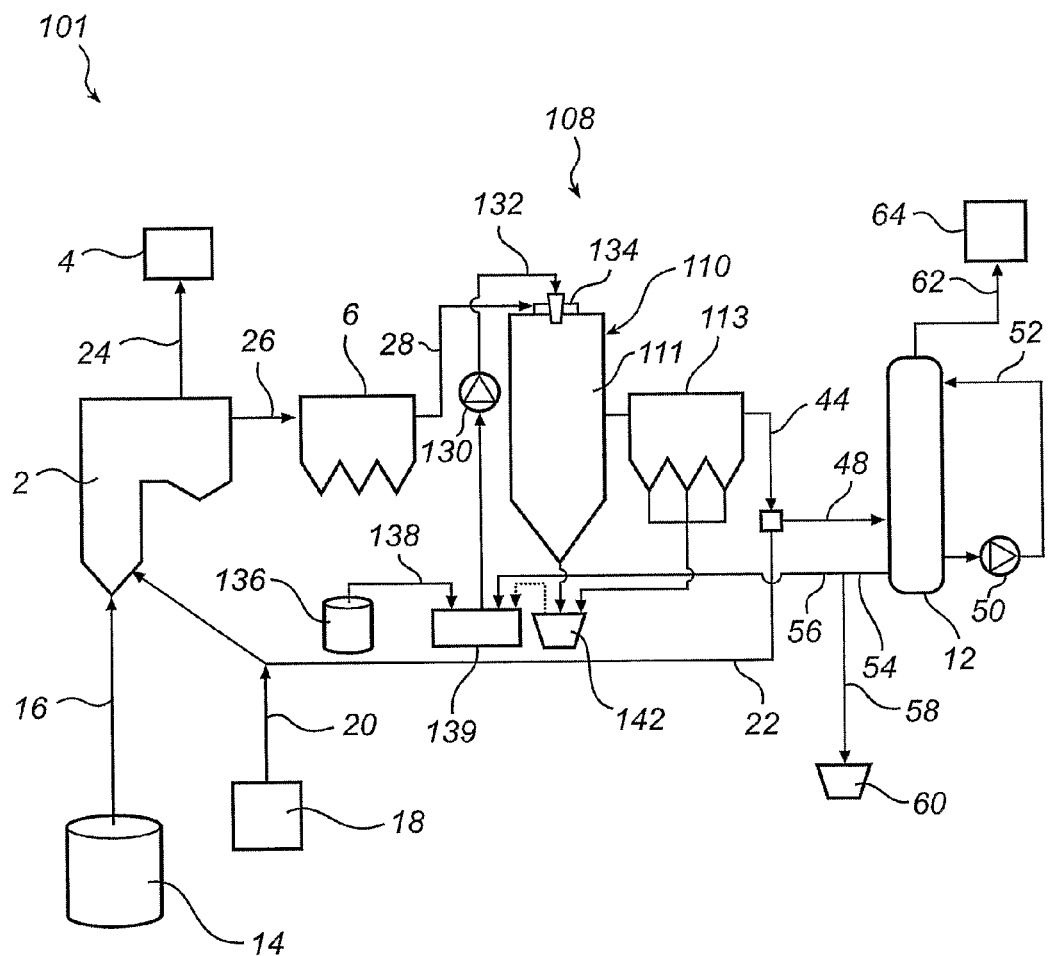
FIG. 2 is a schematic side view of a boiler system in accordance with an alternative embodiment.

FIG. 2 illustrates a boiler system 101 in accordance with a second embodiment. A number of parts of the boiler system 101 are similar to the boiler system 1, described hereinbefore with reference to FIG. 1, and those parts have not been described in detail with reference to FIG. 2, and have been given the same reference numerals as in FIG. 1. The main difference between the boiler system 1 and the boiler system 101 is that a gas cleaning system 108 of the boiler system 101 comprises a first gas cleaning device in the form of a spray dryer absorber 110. The second gas cleaning device is a condenser 12, just as in the embodiment illustrated in FIG. 1. Returning to FIG. 2, the spray dryer absorber 110, which may be of a type that is per se known from, for example, U.S. Pat. No. 4,755,366, comprises a spray dryer chamber 111 and a dust particle remover 113. The spray dryer chamber 111 comprises at least one disperser 134 which is operative for atomizing a lime stone slurry and to mix the lime stone slurry with the carbon dioxide rich flue gas coming from the electrostatic precipitator 6 via the duct 28. Inside the spray dryer chamber 111 the atomized lime stone slurry reacts with sulphur dioxide of the flue gas generated in the boiler 2 and forms a dry rest product. The dry rest product is collected in the bottom of the spray dryer chamber 111 and in the particle remover 113, which may be a fabric filter, which is per se known from, for example, U.S. Pat. No. 4,336,035. The dry rest product is then forwarded to disposal, schematically indicated as 142. The lime stone slurry is prepared in a mixing tank 139 to which fresh lime stone, $CaCO_3$, is supplied from a lime stone storage 136 via a supply pipe 138. The pipe 56 is operative for forwarding condensed water from the condenser 12 to the mixing tank 139. Hence, the condensed water generated in the condenser 12 is utilized as make up water in the preparation of lime stone slurry for the spray dryer absorber 110. Optionally, a portion of the dry rest product collected in the disposal 142 may be recirculated to the mixing tank 139 for being mixed with the fresh lime stone and the make up water. A pump 130 is operative for transporting the lime stone slurry from the mixing tank 139 to the disperser 134 via a supply pipe 132. The parts of the boiler system 101 not specifically mentioned have a similar design and function as their corresponding parts of the boiler system 1.

Figure 3:
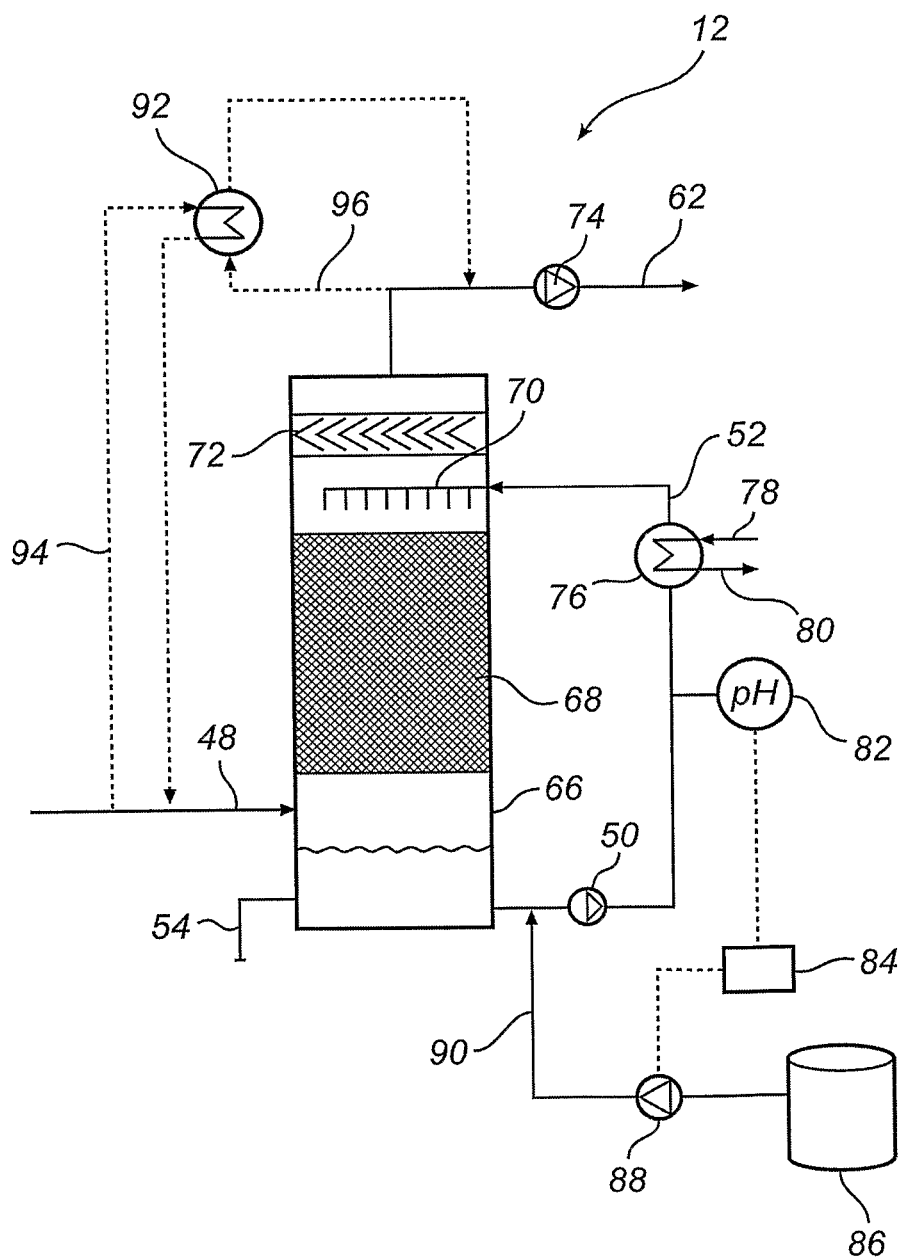
FIG. 3 is a schematic side view of a second gas cleaning device in accordance with a first embodiment.

FIG. 3 illustrates the second gas cleaning device in the form of the condenser 12 in more detail. The condenser 12 comprises a tower 66, which is filled with a packing material 68 for providing good contact between the partly cleaned carbon dioxide rich flue gas coming from the first gas cleaning device, i.e., from the wet scrubber 10 or the spray dryer absorber 110, and the cooling liquid being circulated in the condenser 12 by means of the pump 50 in the pipe 52. The packing material 68 could be of the so-called structured packing type, of which Mellapak Plus, which is available from Sulzer Chemtech USA Inc, Tulsa, USA, is one example, or a so-called random packing type, of which Jaeger Tri-Pack, which is available from Jaeger Products, Inc, Houston, USA, is one example. A liquid distributor 70 is operative for distributing the cooling liquid over the packing material. In this case, the cooling liquid comprises mainly water, which is brought into direct contact with the flue gas. The liquid distributor 70, which may be, for example, Jaeger Model LD3 or Model LD4, which are available from Jaeger Products, Inc, Houston, USA, distributes the liquid evenly over the packing material 68 without causing an undue formation of small liquid droplets.

The partly cleaned carbon dioxide rich flue gas is supplied, via the duct 48, to the lower end of the tower 66 and moves vertically upwards through the tower 66, being brought into contact, in a counter-current flow manner, with the cooling liquid flowing down through the packing material 68. At the upper end of the tower 66 a mist eliminator 72 is arranged. The mist eliminator 72 is operative for removing liquid droplets from the flue gas. The cleaned carbon dioxide rich flue gas then leaves the condenser 12 via the duct 62. A fan 74 is operative for forwarding the cleaned carbon dioxide rich flue gas to the gas processing unit 64 illustrated hereinbefore with reference to FIG. 1.

A heat exchanger 76 is arranged in the pipe 52, as illustrated in FIG. 3. The heat exchanger 76 is operative for cooling the cooling liquid being transported in the pipe 52. A cooling media, such as water, water containing glycol, etc. is supplied to the heat exchanger 76 via a pipe 78, and leaves the heat exchanger 76 via a pipe 80. The cooling media may, for example, come from a cooling tower.

A pH-sensor 82 is operative for measuring the pH of the cooling liquid being forwarded in the pipe 52. A control unit 84 is operative for receiving a signal from the pH-sensor 82. The control unit 84 is operative for controlling the supply of an alkaline substance from an alkaline substance storage 86. The alkaline substance may, for example, be sodium hydroxide, NaOH, in an aqueous solution. Hence, the control unit 84 is operative for comparing the pH as measured by means of the pH sensor 82 to a pH set point. When the pH measured by the pH sensor 82 is below the pH setpoint the control unit 84 sends a signal to an alkali supply device in the form of a pump 88 to the effect that alkaline substance is to be pumped from the storage 86 via a pipe 90 to the pipe 52 in order to increase the pH of the cooling liquid.

Optionally, a gas-gas heat exchanger 92 may be provided. A duct 94, illustrated by a dashed line in FIG. 3, is operative for forwarding at least a portion of the flow of the partly cleaned carbon dioxide rich flue gas from the duct 48 to the heat exchanger 92, and then back again. A duct 96, illustrated by a dashed line in FIG. 3, is operative for forwarding at least a portion of the flow of the cleaned carbon dioxide rich flue gas of the duct 62 to the heat exchanger 92, and then back to the duct 62.

The manner in which the gas cleaning systems 8 and 108 operate will now be described by means of an example, and with reference to FIGS. 1-3. The carbon dioxide rich flue gas containing sulphur dioxide generated in the boiler 2 typically has a temperature, in the duct 28, of 120 to 200° C. and enters the gas cleaning system 8 via the duct 28. The carbon dioxide rich flue gas leaving the boiler 2 typically contains 2000-15 000 mg/Nm$^3$ of sulphur dioxide, $SO_2$, on a dry gas basis, and water vapour, carbon dioxide, oxygen and nitrogen in the amounts indicated hereinbefore. The flue gas enters the first gas cleaning device in the form of the wet scrubber 10 and is brought into contact with the circulating lime stone slurry which results in a removal of at least 80%, more preferably at least 90%, and most preferably at least 95%, of the sulphur dioxide content of the carbon dioxide rich flue gas coming from the boiler 2, thereby generating a partly cleaned carbon dioxide rich flue gas. Typically, the wet scrubber 10 removes 95-99.5% of the sulphur dioxide, meaning that the partly cleaned carbon dioxide rich flue gas leaving the wet scrubber 10 via the duct 44 will typically have a sulphur dioxide content of 50-300 mg/Nm$^3$ dry gas basis, and a temperature of 60-80° C. The partly cleaned carbon dioxide rich flue gas leaving the wet scrubber 10 will be substantially saturated with water vapour.

The contact between the carbon dioxide rich flue gas containing sulphur dioxide and having, upon entry in the wet scrubber 10, a temperature of 120-200° C., and the lime stone slurry being supplied to the wet scrubber 10 results in evaporation of water in the wet scrubber 10. The condensed water being forwarded to the wet scrubber 10 from the condenser 12 via the pipe 56 makes up for the water evaporated in the wet scrubber 10. The water content of the flue gas will increase somewhat as an effect of the evaporation. Hence, the partly cleaned carbon dioxide rich flue gas leaving the wet scrubber 10 may, typically, have a water vapour content of 24-56%.

In the event a spray dryer absorber 110 is utilized, in accordance with the embodiment of FIG. 2, the partly cleaned carbon dioxide rich flue gas leaving the spray dryer absorber 110 may typically have a temperature of 90-120° C., such partly cleaned carbon dioxide rich flue gas being unsaturated with respect to water vapour, but having, as an effect of the evaporation of the water portion of the lime stone slurry in the spray dryer chamber 111, a higher concentration of water vapour, typically 22-53% by volume, than the carbon dioxide rich flue gas leaving the boiler 2.

A portion, typically 50-90% by volume, of the partly cleaned carbon dioxide rich flue gas leaving the wet scrubber 10, via the duct 44, is returned to the boiler 2 via the duct 22. The portion of the partly cleaned carbon dioxide rich flue gas being recirculated to the boiler 2 is not forwarded through the condenser 12, making it possible to design the condenser 12 for a smaller gas flow rate. The remaining portion, typically 10-50% by volume, of the partly cleaned carbon dioxide rich flue gas leaving the wet scrubber 10 is forwarded, via the duct 48, to the condenser 12. The cooling media supplied to the heat exchanger 76 of the condenser 12, as illustrated in FIG. 3, typically has a temperature of 0-30° C., hence cooling the cooling liquid circulating in the pipe 52 to, typically, 2-35° C. In the packing material 68 of the condenser 12 the partly cleaned carbon dioxide rich flue gas is cooled, upon the direct contact with the cooling liquid, to a temperature of typically 3-40° C. As a result of this cooling, being a cooling to a temperature below the saturation temperature, with respect to water vapour, of the partly cleaned carbon dioxide rich flue gas, water condenses inside the condenser 12. Hence, the cleaned carbon dioxide rich flue gas leaving the condenser 12 via the duct 62 will have a water content of only 0.5 to 8% by volume.

The direct contact between the cooling liquid and the flue gas in the packing material 68 of the condenser 12 will also result in a further removal of sulphur dioxide. Typically, the removal efficiency with respect to sulphur dioxide in the condenser 12 will be at least 70%, and often up to 95% or more. Hence, the cleaned carbon dioxide rich flue gas leaving the condenser 12 via the duct 62 may typically have a sulphur dioxide concentration of 5-60 mg/Nm$^3$ dry gas basis, or even lower.

The sulphur dioxide becoming dissolved in the cooling liquid of the condenser 12 will result in a decrease in the pH value of the cooling liquid circulating in the pipe 52. The pH-sensor senses such decrease in pH-value and orders the pump 88 to supply the alkaline substance from the storage 86 to the pipe 52. The set point for the pH-value is typically pH 4-6.5, more preferably pH 4.5-6. Such a setpoint has been found to provide efficient removal of sulphur dioxide, without a large and unwanted removal of carbon dioxide from the flue gas. Controlling the pH value of the cooling liquid circulating in the condenser 12 will also control the removal efficiency of the sulphur dioxide. Hence, the pH set point is typically set to such a value that at least 70% of the sulphur dioxide content of the partly cleaned carbon dioxide rich flue gas is removed in the condenser 12. Other measures of controlling the removal of sulphur dioxide in the condenser 12 include varying the amount of cooling liquid pumped by the pump 50, and the type of packing of the condenser 12, the latter measures also influencing the cooling of the partly cleaned carbon dioxide rich flue gas.

The cooling liquid being circulated by means of the pump 50 in the condenser 12 is preferably a clear liquid, meaning that only small amounts of solids are contained in the circulating liquid. Preferably, the amount of solids in the cooling liquid circulating in the condenser 12 is less than 10 gram/liter, preferably less than 5 gram/liter. In comparison, the slurry circulating in the wet scrubber 10, disclosed hereinbefore with reference to FIG. 1, may typically contain 150-300 gram/liter of solids. An advantage of having a low concentration of solids in the liquid circulating in the condenser 12 is that re-use and cleaning of the condensate water leaving the condenser 12 via the pipe 54 becomes easier, compared to a condensate water being mixed with a high concentration of solid particles. To achieve a low amount of solids in the cooling liquid circulating in the condenser 12 the alkaline substance preferably has a high solubility in water, also at lower temperatures. Preferably, the alkaline substance which is stored in the storage 86 and which is utilized for controlling the pH of the cooling liquid circulating in the condenser 12 has a solubility in water, at a temperature of 20° C., of at least 50 g/liter, more preferably at least 100 g/liter at 20° C. Examples of suitable alkaline substances include sodium hydroxide (NaOH), potassium hydroxide (KOH), sodium carbonate ($Na_2CO_3$), and sodium bicarbonate ($NaHCO_3$). Often, the most preferred alkaline substance is sodium hydroxide (NaOH).

Furthermore, the fact that a significant condensation occurs in the packing material 68 provides for an efficient removal of sulphur trioxide, $SO_3$, which is present in the partly cleaned carbon dioxide rich flue gas largely in the form of an aerosol. Without being bound by any theory, it is believed that the water condensing in the packing material 68 to a large extent condenses on the aerosol particles, making such aerosol particles grow to droplets of such a size that they become captured by the circulating cooling liquid circulating in the packing material 68.

The flue gas is then passed through the mist eliminator 72 removing most of the liquid droplets that might have been entrained with the flue gas flow. The flue gas, which may in this stage be referred to as a cleaned carbon dioxide rich flue gas, then leaves the condenser 12 via the duct 62. Optionally the cleaned carbon dioxide rich flue gas of the duct 62 may be reheated in the heat exchanger 92 by means of the partly cleaned carbon dioxide rich flue gas of the duct 48 as described with reference to and illustrated in FIG. 3. Such reheating may increase the temperature of the cleaned carbon dioxide rich flue gas of the duct 62 by 5-20° C. The advantage of reheating the cleaned carbon dioxide rich flue gas is that some of the very small droplets and mist that have passed through the mist eliminator 72 may become evaporated, which may be an advantage to the downstream gas processing unit 64, illustrated in FIG. 1. The reheating of the cleaned carbon dioxide rich flue gas in the heat exchanger 92 may also be achieved by means of another heating medium, such as the condensed water in the circulation pipe 52 upstream of the heat exchanger 76, a low pressure steam, or hot water from another part of the process.

Figure 4:
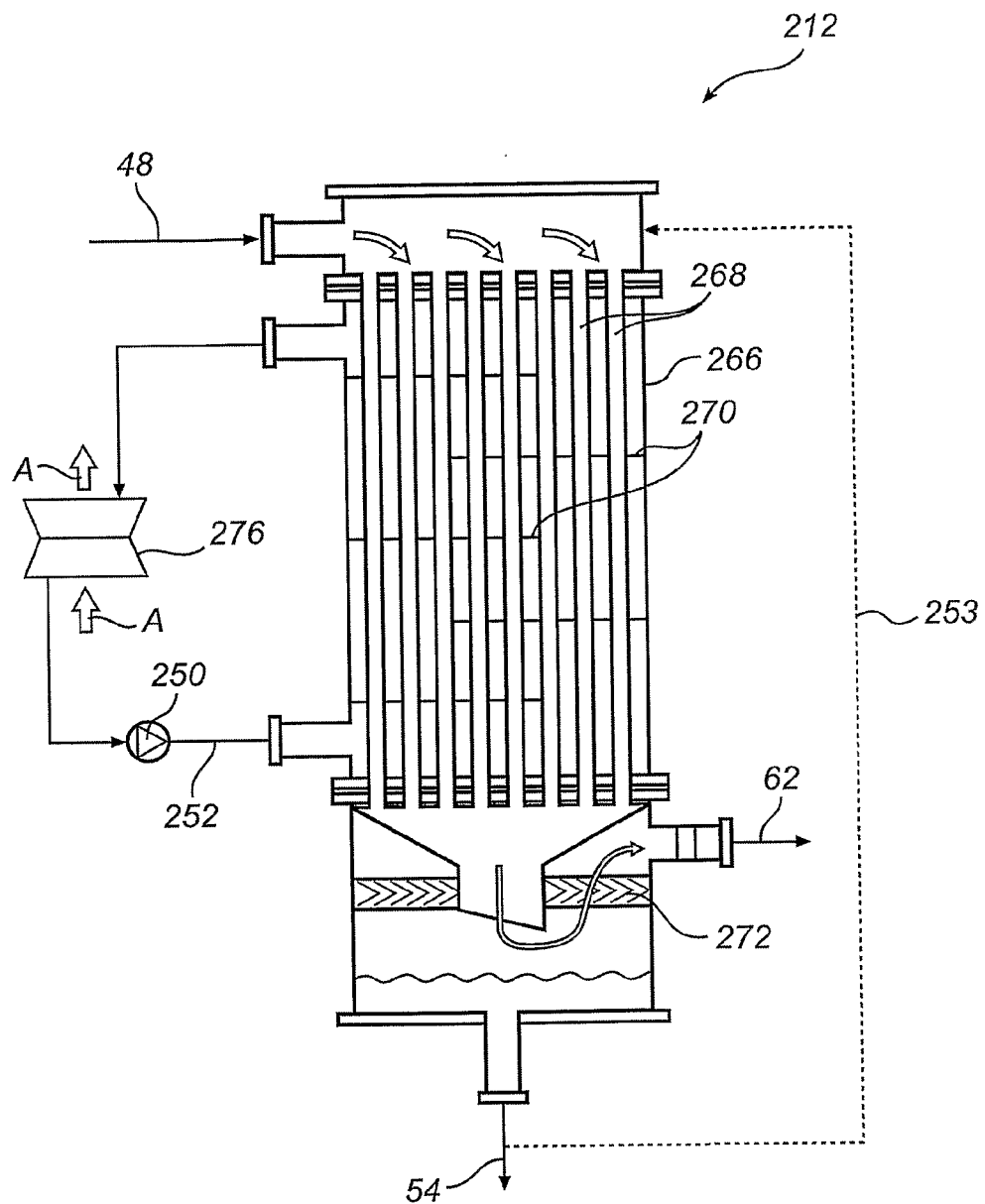
FIG. 4 is a schematic side view of a second gas cleaning device in accordance with a second embodiment.

FIG. 4 illustrates an alternative condenser 212 which is of the tube-cooler type. Details illustrated in FIG. 4 that have the same function as the corresponding details of FIG. 3 have been given the same reference numerals. The condenser 212 has a tower 266. A plurality of tubes 268 are arranged in the tower 266. The partly cleaned carbon dioxide rich flue gas is supplied, via the duct 48, to the upper end of the tower 266 and moves vertically downwards through the tower 266, and at the inside of the tubes 268. The flue gas leaves the lower end of the tower 266 via the duct 62.

A pump 250 is operative for circulating a cooling liquid in a pipe 252 to the tower 266. The cooling liquid is, inside the tower 266, transported on the outside of the tubes 268. Hence, the cooling in the condenser 212 is an indirect cooling process, in which the flue gas being forwarded inside the tubes 268 is cooled by means of the cooling liquid being brought into contact with the outside of the tubes 268. Since there is no physical contact between the flue gas flow and the cooling liquid, the cooling liquid will not be contaminated. A cooling device in the form of a cooling tower 276 is arranged along the pipe 252 to cool the cooling liquid that has passed through the tower 266 before the liquid is again introduced in the tower 266. The cooling tower 276 could be cooled by air, indicated by arrows A in FIG. 4, or another medium. Baffles 270 are arranged in the tower 266 to improve the contact between the cooling liquid and the outer surfaces of the tubes 268.

As a result of the cooling of the partly cleaned carbon dioxide rich flue gas a condensation of a portion of the water content of the flue gas will occur in the tower 266. The liquid water condensate formed through such condensation will flow downwards through the tubes 268 and end up in the lower portion of the tower 266. The condensate leaves the tower 266 via the pipe 54 transporting the condensate to the wet scrubber 10, or to the spray dryer absorber 110, and to disposal, as described hereinbefore with reference to FIGS. 1 and 2. The condensation of the water inside the tubes 268 will result in the formation of a water mist which will capture at least a portion of the sulphur dioxide content of the partly cleaned carbon dioxide rich flue gas. Furthermore, aerosol particles may grow as an effect of such condensation. Hence, the liquid condensate leaving the tower 266 via the pipe 54 will contain some captured sulphur dioxide, and some captured sulphur trioxide aerosol.

Optionally, some of the liquid water condensate may be recirculated to pass through the tubes 268 once more. Such recirculation could be achieved by means of a pipe 253, illustrated with a dotted line in FIG. 4, and a not shown pump. A pH-control device of the type illustrated in FIG. 3 could also be utilized to control the pH-value of the recirculated condensate to a pH of 4-6.5. The purpose of such recirculation would be to increase the removal of pollutants, such as sulphur dioxide, by bringing the flue gas flow flowing through the tubes 268 into direct contact with an increased amount of liquid.

A mist eliminator 272 is arranged in the lower portion of the tower 266 for the purpose of removing condensate droplets from the cleaned carbon dioxide rich flue gas before the cleaned carbon dioxide rich flue gas is allowed to leave the tower 266 via the duct 62. As alternative to, or in combination with, the horizontal arrangement of the mist eliminator 272 illustrated in FIG. 4, a mist eliminator may be arranged in a vertical position in the duct 62, and/or in the transition between the tower 266 and the duct 62.

It will be appreciated that numerous variants of the embodiments described above are possible within the scope of the appended claims.

Hereinbefore it has been described that the second gas cleaning device is a condenser 12 having a packing, in which the partly cleaned carbon dioxide rich flue gas is brought into direct contact with a cooling liquid, or a condenser 212 having tubes 268, in which the partly cleaned carbon dioxide rich flue gas is indirectly cooled by means of the cooling liquid. It will be appreciated that other types of condensers may also be utilized, including open spray towers in which the cooling liquid is atomized by means of atomizing nozzles, and is subsequently brought into direct contact with the partly cleaned carbon dioxide rich flue gas.

Hereinbefore it has been described that lime stone, $CaCO_3$, is supplied to the wet scrubber 10, or to the spray dryer absorber 110. It will be appreciated that other absorbents may also be utilized, including sorbents comprising hydrated lime, $Ca(OH)_2$. Utilizing absorbents comprising calcium, such as lime stone, $CaCO_3$, and hydrated lime, $Ca(OH)_2$, have the advantages of producing a rest product comprising gypsum, $CaSO_4$, or calcium sulphite, $CaSO_3$, both of which are comparably harmless and easy to dispose of, or even re-use, in particular in the case of gypsum. A further advantage is that absorbents comprising calcium are comparably cheap.

Hereinbefore it has been described that the wet scrubber 10 of FIG. 1 is of the so-called tower scrubber type, as disclosed in EP 0 162 536. It will be appreciated that other wet scrubber types may be utilized as well. One example of a wet scrubber which may be utilized as an alternative to the wet scrubber 10 disclosed with reference to FIG. 1 is the so-called bubbling bed scrubber. In a bubbling bed scrubber, an example of which is disclosed in WO 2005/007274, the flue gas is forwarded through an apertured plate over which a flowing layer of a slurry containing lime stone is forwarded. Upon contact between the flowing layer of slurry and the flue gas sulphur dioxide is captured in the flowing layer of slurry, hence yielding a partly cleaned carbon dioxide rich flue gas.

Hereinbefore it has been described, with reference to FIG. 2, that a spray dryer absorber 110 may be utilized for removing sulphur dioxide from a flue gas. It will be appreciated that other types of scrubbers yielding a dry end product may also be utilized. One such scrubber is disclosed in WO2004/026443. The scrubber disclosed in WO2004/026443 is a moistened dust type of scrubber which comprises a mixer in which a recirculated dust material is mixed with fresh absorbent, such as hydrated lime, $Ca(OH)_2$, and water to form a moistened dust, which is then mixed with the flue gas. The moistened dust reacts with sulphur dioxide of the flue gas to form a solid and dry reaction product which is then removed in a filter, such as a fabric filter.

To summarize, a gas cleaning system 8 for cleaning a carbon dioxide rich flue gas containing sulphur dioxide generated in a boiler 2 comprises a first gas cleaning device 10 being operative for removing at least 80% of the sulphur dioxide content of the flue gas generated in the boiler 2, thereby generating a partly cleaned carbon dioxide rich flue gas, and a second gas cleaning device 12, being separate from the first gas cleaning device 10 and being operative for receiving at least a portion of the partly cleaned carbon dioxide rich flue gas that passed through the first gas cleaning device 10. The second gas cleaning device 12 is operative for removing at least a portion of the water content of the partly cleaned carbon dioxide rich flue gas by means of cooling the partly cleaned carbon dioxide rich flue gas to condense water there from.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of cleaning a carbon dioxide rich flue gas containing sulphur dioxide generated in a boiler combusting a fuel in the presence of a gas containing oxygen gas, the method comprising:
removing at least 80% of the sulphur dioxide content of the flue gas generated in the boiler in a first gas cleaning device to generate a partly cleaned carbon dioxide rich flue gas,
forwarding at least a portion of the partly cleaned carbon dioxide rich flue gas to a second gas cleaning device, the second gas cleaning device being separate from the first gas cleaning device,
cooling, in said second gas cleaning device, the partly cleaned carbon dioxide rich flue gas to condense water therefrom, thereby generating a cleaned carbon dioxide rich flue gas having a lower concentration of water vapour than the partly cleaned carbon dioxide rich flue gas, and
forwarding at least a portion of the condensed water that is formed in the second gas cleaning device to the first gas cleaning device as make-up water,
wherein 50-90% by volume of the partly cleaned carbon dioxide rich flue gas leaving the first gas cleaning device is recirculated to the boiler without such portion being first passed through the second gas cleaning device.

2. The method according to claim 1, wherein said step of cooling, in the second gas cleaning device, the partly cleaned carbon dioxide rich flue gas to condense water therefrom, comprises bringing the partly cleaned carbon dioxide rich flue gas into direct contact with a cooling liquid.

3. The method according to claim 2, wherein the pH-value of the cooling liquid is controlled to be in the range of pH 4-6.5 by means of supplying an alkaline substance having a solubility in water at 20° C. of at least 50 gram/liter to said cooling liquid.

4. The method according to claim 3, wherein said alkaline substance is chosen from the group of alkaline substances comprising sodium hydroxide, potassium hydroxide, and sodium carbonate.

5. The method according to claim 2, wherein said cooling liquid comprises less than 10 gram/liter of solids.

6. The method according to claim 1, wherein said step of cooling, in the second gas cleaning device, the partly cleaned carbon dioxide rich flue gas to condense water therefrom comprises cooling the partly cleaned carbon dioxide rich flue gas to such a temperature that the cleaned carbon dioxide rich flue gas comprises 0.5 to 8% by volume of water vapour.

7. The method according to claim 1, wherein the at least a portion of the condensed water that is forwarded to the first gas cleaning device as make-up water is passed through at least one pipe connected between the first gas cleaning device and the second gas cleaning device.

8. The method according to claim 1, wherein said step of removing at least 80% of the sulphur dioxide content of the flue gas generated in the boiler in the first gas cleaning device, comprises bringing the flue gas generated in the boiler into direct contact with a calcium based absorbent.

9. The method according to claim 1, wherein said second gas cleaning device is controlled to remove at least 70% of the sulphur dioxide content of the partly cleaned carbon dioxide rich flue gas.

10. The method of claim 1, wherein:
the first gas cleaning device is connected to the boiler, and the second gas cleaning device is connected to the first gas cleaning device,
the first gas cleaning device is operative to receive the carbon dioxide rich flue gas generated in the boiler to remove at least a portion of the sulphur dioxide content of the flue gas generated in the boiler, and
the second gas cleaning device, being separate from the first gas cleaning device, is operative to receive at least a portion of the partly cleaned carbon dioxide rich flue gas that has passed through the first gas cleaning device.

* * * * *

UNITED STATES PATENT AND TRADEMARK OFFICE
CERTIFICATE OF CORRECTION

PATENT NO.        : 9,486,736 B2
APPLICATION NO.   : 13/513860
DATED             : November 8, 2016
INVENTOR(S)       : Grubbström et al.

Page 1 of 1

It is certified that error appears in the above-identified patent and that said Letters Patent is hereby corrected as shown below:

On the Title Page

In Item (75), under "Inventors", in Column 1, Line 1, delete "Vaxjo" and insert -- Växjö --, therefor.

In Item (75), under "Inventors", in Column 1, Line 2, delete "Vaxjo" and insert -- Växjö --, therefor.

In Item (57), under "ABSTRACT", in Column 2, Line 15, delete "there from." and insert -- therefrom. --, therefor.

Signed and Sealed this
Thirty-first Day of January, 2017

Michelle K. Lee
*Director of the United States Patent and Trademark Office*